United States Patent [19]

Jensen

[11] Patent Number: 4,559,199

[45] Date of Patent: Dec. 17, 1985

[54] APPARATUS AND METHOD FOR FORMING APERTURES IN FILM MATERIALS

[76] Inventor: Harold A. Jensen, 31 Annadea Rd., Brockton, Mass. 02402

[21] Appl. No.: 620,009

[22] Filed: Jun. 13, 1984

[51] Int. Cl.⁴ ........................ B29D 9/04

[52] U.S. Cl. ........................ 264/511; 264/154; 425/290; 425/302.1

[58] Field of Search ............... 425/290, 303, 295, 300, 425/302.1, 315; 264/209.3, 150, 159, 520, 531, 566, 154, 163, 155, 156, 524, 511, 568

[56] References Cited

U.S. PATENT DOCUMENTS

| | | | |
|---|---|---|---|
| 3,771,938 | 11/1973 | Pinto et al. | 425/302.1 |
| 4,184,831 | 1/1980 | Hegler et al. | 425/303 |

*Primary Examiner*—Jay H. Woo
*Assistant Examiner*—J. Fortenberry
*Attorney, Agent, or Firm*—Thompson, Birch, Gauthier & Samuels

[57] ABSTRACT

A continuous tubular film passes through two opposed vacuum plates. One of the vacuum plates has a heated die formed therein. The film is pillowed and a portion contacts the die. A section is cut from the film and removed and, subsequently, the pillowed film is deflated. These steps are repeated in timed sequence. The apparatus and process allows the forming of apertures or sections in one side of a tubular film alone.

13 Claims, 6 Drawing Figures

APPARATUS AND METHOD FOR FORMING APERTURES IN FILM MATERIALS

The invention relates to the field of flexible packaging and more particular to performing a sectioning step on a tubular film, which film is formed into bags.

In flexible packaging there are different types of bags formed. There are side weld bags where the seams are joined along the sides of the bags. The bags are typically formed by joining ribbonlike films together. There are bottom weld bags where the seam is formed along the bottom of the bag. The bags are typically formed by extruding a tubular film. The film in flat two-ply form is sealed along one line at a first location to form the bottom of one bag; and perforated or cut along a second line parallel to the first line, to form the top of the next bag. If it is desired to form a section in a bottom weld bag, such as at the top to form grips, a cut is made through both plys such as by a heated die.

The bags, typically made of polyethylene film or the like, when first formed and distributed for use have a tendency to cling to one another such that the opening of any particular bag may cause some inconvenience, as well as the separation of one bag from another. In some uses of such bags, such as in deli counters, checkout registers etc. there is time wasted in separating the bags and subsequently opening the bags which results in frustration and sometimes the bags are discarded because they do not open easily. If bottom sealed bags could be formed with an opening on one side of the bag only, the problems attendant to separating and subsequently opening such bags would be overcome. For example if a crescent shaped opening were formed in one ply at the top of the bag, then simply by passing a finger through the opening and sliding downwardly a user of the bags would necessarily grab one side of the bag and by applying tension to the bag it would separate from the other bags to which it is joined as well as separate one ply of the bag from the other; i.e. open the bag.

The present invention is directed to an apparatus and method for forming a section in one ply of a multi-ply film. In a preferred embodiment a flattened tubular film has a section formed in one side thereof. The use of the term "section" is intended to mean that a complete opening could be made in one ply of the bag such as a circle, square, ellipse or the like; that an opening could be formed just along the upper edge of one side of the bag such as a cresent shaped opening; and/or a perforated line of any geometric configuration could be formed.

Broadly, the apparatus of my invention comprises means to separate a multi-ply film by inflating said film, means to maintain the film in a separated condition, and means to perform a cutting operation on at least one ply of the film to form a section while the film is in a separated state.

The method of my invention broadly comprises performing a cutting operation on a continuous tubular film which includes moving the film in a flat configuration, inflating said film such that the plys of the film are separated from one another, performing a cutting operation on at least one of the plys of the film while the film is in its inflated state and subsequently deflating the film whereby it resumes its flat configuration.

DESCRIPTION OF THE PREFERRED EMBODIMENT

The invention will be described in reference to polyethylene film extruded in tubular form. This film is typically flattened with or without side gussets, and may be printed in various colors on one or both sides. Ultimately, the film is heat sealed along an edge to form the bottom of the bag and perforated along a line parallel to and adjacent to the heat sealed line to form the top of an immediately preceding bag. These steps comprise the well known prior art method for producing such bags.

In my invention upstream of the station where the bags are sealed and cut to size, vacuum plates in spaced apart parallel relationship are secured above and below the travelling film. Preferably the film travels on or is adjacent to the bottom vacuum plate.

Figure 1:
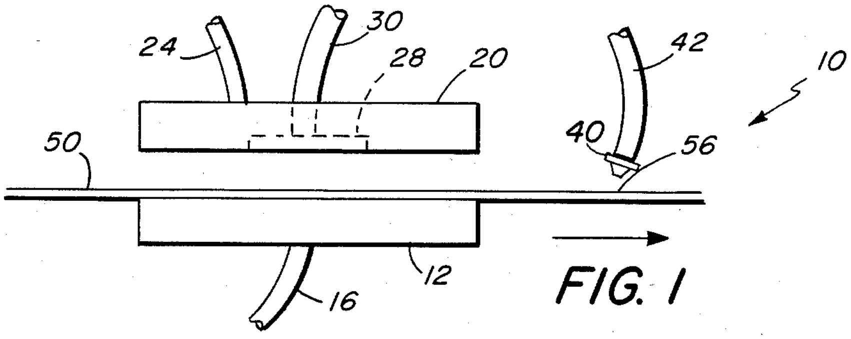
FIG. 1 is an embodiment of the invention in a side schematic view.
Figure 2:
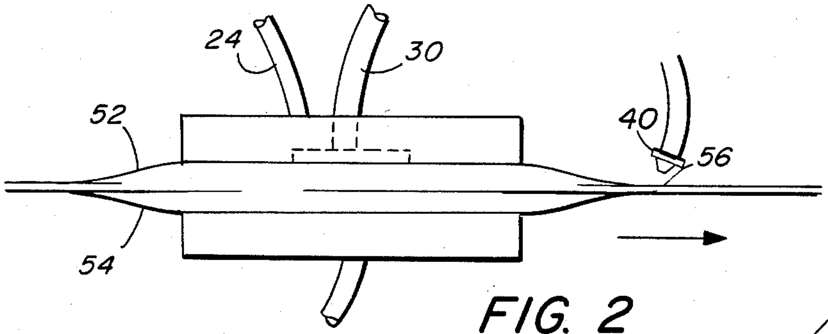
FIG. 2 is a side schematic view of FIG. 1 wherein the film has been inflated.
Figure 3:
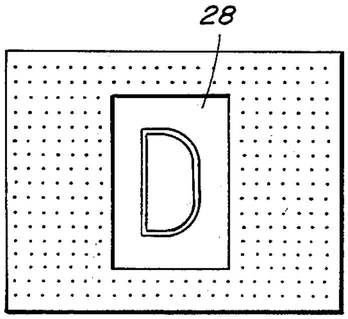
FIG. 3 is a bottom view of a vacuum plate of FIG. 1.

Referring to FIGS. 1 and 2 the apparatus is shown generally at 10 and comprises a bottom vacuum plate 12 having a plurality of perforations 14 therein (the perforations shown in FIG. 3). A vacuum line 16 creates the vacuum within the plate.

Above vacuum plate 12 is a vacuum plate 20 having plurality of perforations about its outer perimeter and a vacuum line 24 to create the vacuum in the plate 20. Additionally, recessed in the plate 22 is a dieholder 28 to which is secured a die 26. The dieholder 28 in and of itself forms a cavity to which is secured a vacuum line 30.

Downstream of the vacuum plates is a nozzle 40 joined to a compressed airline 42.

Passing between the plates is a side gussetted polyethylene two-ply film 50 comprising plys 52 and 54 and a cut 56.

The following operation of the invention will be described with reference to a specific example. High density polyethylene film, two-ply, one mil thick formed as a continuous tube is flattened and passes through the vacuum plates 12 and 20. Initially, a cut shown at 56 is made manually in the upper ply, when the cut reaches the nozzle 42 as shown in FIG. 1 the film expands or billows as shown in FIG. 2. The vacuum on vacuum plate 20 is between 22–25 inches Hg. The vacuum on vacuum plate 12 is about 10 inches. These vacuums are preferably applied continuously. When the film billows it contacts the die 26 and the vacuum then applied to line 30 is approximately 29 inches Hg. The ply of film which contacts the die is cut by the die. The die is a hot wire as shown more clearly in FIG. 3 which wire defines the geometry of the section or blank to be removed. The blank removed passes through the vacuum line 30 from which it is ultimately discharged.

Figure 4:
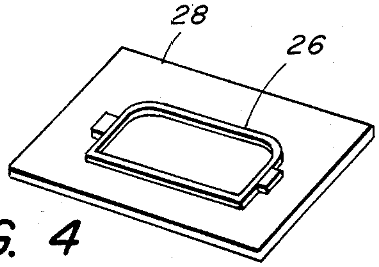
FIG. 4 is a perspective illustration of the die used in the vacuum plate of FIG. 3.

In the working example the plates 12 and 20 were approximately 5 inches by 6 inches with a depth of 1 inch and a spatial separation between the facing portions of the plates of approximately a ½ inch. Formed into plate 12 was a chamber approximately 2 inches by 3 inches into which was secured the holder 28 having the die 26 received therein. The die is shown most clearly in FIG. 4. The vacuum created in the dieholder chamber is independent of that created in the vacuum plate 20. The perforations in each of the plates were 1/16 inch diameter holes based on 1 inch spacing. The die (wire) was nickel-chromium wire 0.0035 inch thick, and ⅛ inch wide. A current of 13 to 15 amps at 4 to 4½ volts was applied. The actual dieholder was asbestos glass, Marinite ®. The flow of air through the airline 42 was at approximately 60 psig through a ¼ inch tubular opening.

After the cut has been made, the vacuum in line 30 ceases. The film moves in the direction of the arrow. The top ply with the hole settles and the film resumes its travel until the hole just formed is contacted by the air jet from line 42. The film inflates and the cutting operation is performed. These steps continue in timed sequence.

Depending upon the specific film, the size of the cut and other operating conditions the process can be run continuously or continually; that is, in the latter instance the film can be stopped for a fraction of a second after inflating to allow for the cutting and removal of the blank.

Figure 5:
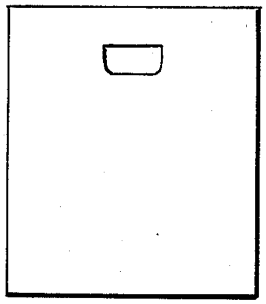
FIG. 5 is an illustration of a bag of the preferred embodiment.
Figure 7:
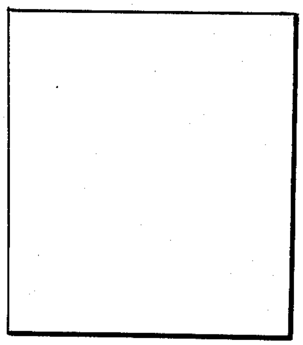
FIG. 7 is a bag of an alternative embodiment of my invention.

A bag produced by the invention is shown in FIG. 5.

Figure 6:
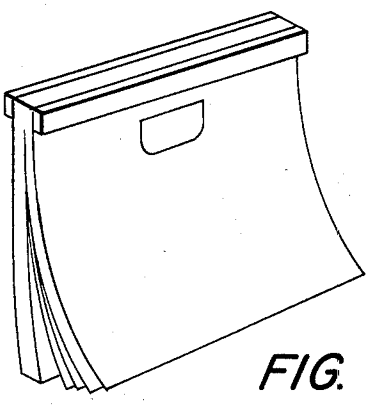
FIG. 6 is a perspective illustration of a plurality of bags produced with the method of my invention.

As shown in FIG. 6 the bags are typically formed in bundles and when necessary for use a bag is removed from the bundle. With the invention by inserting a finger or other device into the opening the bag can be both removed from the bundle with ease and also the bag itself opened with ease.

The invention has been described in reference to the cutting of and removal of a circular blank from one side of a two-ply tubular film. Obviously different geometric shapes of blanks may be removed from the ply. Also if desired the portion to be removed could be simply perforated such as by using a serrated dye and the blank removed later. Additionally different blanks could be removed from both sides of the two-ply film; that is, dies could be placed within both vacuum plates and either vacuum plate may contain one or more dies. The film used in the invention could be any film such as is currently experienced in flexible film packaging such as any of the polyethylenes etc. Further other materials of constructions can be used for the dye.

I claim:

1. A method for sectioning a continuous tubular film which includes:

introducing the film in a flat configuration between two vacuum plates spaced apart from one another;

inflating the film to billow the same by introducing an air stream into the film downstream of said plates such that the one ply of the film contacts one vacuum plate and the other ply of the film contacts the other vacuum plate the other vacuum plate having a die; the other ply drawn into engagement with the die said other ply cut substantially simultaneously upon contacting the die thereby forming a section; and deflating said film whereby it resumes its flat configuration.

2. The method of claim 1 which comprises:

engaging continuously one ply of the film by one of said plates.

3. The method of claim 1 which includes cutting the ply through an entire perimeter.

4. The method of claim 1 which includes cutting the ply as a perforated line.

5. The method of claim 1 which includes first inflating the film and subsequently cutting the film in timed sequence.

6. The method of claim 1 which includes cutting by a heated die.

7. The method of claim 6 which includes cutting by a heated wire.

8. An apparatus for performing a sectioning operation on a continuous tubular film which comprises:

a first vacuum plate having a die secured thereto;

a second vacuum plate spaced apart from the first vacuum plate to define a passage there between;

means to transport a continuous film through the passage;

means downstream of the vacuum plates to introduce an airstream into the continuous tubular film to billow the same; and means to control sequentially the billowing of the film whereby when the film is billowed it contacts and is temporarily held by the first and second vacuum plates and the portion of the film contacting the die is removed to form a section in the film and subsequent to said sectioning the introduction of air is ceased.

9. The apparatus of claim 8 wherein:

the second vacuum plate includes a die.

10. The apparatus of claim 9 wherein:

the die in the second place is offset from the die in the first vacuum plate.

11. The apparatus of claims 8 or 9, which includes means to remove the sectioned piece through the vacuum plate.

12. The method of claim 1 which includes introducing the air stream into the section.

13. The method of claim 12 which includes:

ceasing the vacuum of the other plate; and introducing subsequent to said cessation of vacuum the air stream into the film.

* * * * *